US012413926B2

(12) United States Patent
Umezawa et al.

(10) Patent No.: US 12,413,926 B2
(45) Date of Patent: Sep. 9, 2025

(54) INFORMATION PROVIDING SYSTEM, INFORMATION PROVIDING METHOD, AND NON-TRANSITORY COMPUTER-READABLE MEDIUM

(71) Applicants: JTEKT CORPORATION, Kariya (JP); connectome.design Inc., Tokyo (JP)

(72) Inventors: Hiroki Umezawa, Nagoya (JP); Yoshiyuki Shibata, Toyota (JP); Akira Sato, Chiyoda-ku (JP)

(73) Assignees: JTEKT CORPORATION, Kariya (JP); connectome.design Inc., Tokyo (JP)

( * ) Notice: Subject to any disclaimer, the term of this patent is extended or adjusted under 35 U.S.C. 154(b) by 259 days.

(21) Appl. No.: 18/190,220

(22) Filed: Mar. 27, 2023

(65) Prior Publication Data

US 2023/0319499 A1 Oct. 5, 2023

(30) Foreign Application Priority Data

Mar. 30, 2022 (JP) ................................. 2022-056333

(51) Int. Cl.
*H04S 7/00* (2006.01)

(52) U.S. Cl.
CPC .......... *H04S 7/303* (2013.01); *H04S 2400/13* (2013.01)

(58) Field of Classification Search
CPC ............................. H04S 7/303; H04S 2400/13
USPC ........................................... 381/82, 310, 303
See application file for complete search history.

(56) References Cited

U.S. PATENT DOCUMENTS 11,322,129 B2 * 5/2022 Tanaka ............. G10K 11/17827
2014/0126758 A1 * 5/2014 Van Der Wijst ........ H04S 7/303 381/310
2018/0341982 A1 11/2018 Gotoh
2021/0256951 A1 * 8/2021 Tanaka ............. G10K 11/17837

FOREIGN PATENT DOCUMENTS

JP 2014-236259 A 12/2014
JP 2017-103598 A 6/2017

* cited by examiner

*Primary Examiner* — William A Jerez Lora
(74) *Attorney, Agent, or Firm* — Oblon, McClelland, Maier &Neustadt, L.L.P.

(57) ABSTRACT

An information providing system includes: a processor; and a memory storing instructions that, when executed by the processor, cause the information providing system to perform operations including: acquiring position information indicating a user position; acquiring at least one of pieces of data information, each including sound information representing a sound, range information associated with the sound information and representing a predetermined range on a map, and reproduction information associated with the sound information and indicating settings related to reproduction of the sound in the sound information; and reproducing a sound by referring to the at least one of pieces of data information based on the position information. In a case in which there are one or more pieces of range information representing ranges including the user position, the reproduction processing is executed for each of the one or more pieces of range information.

11 Claims, 7 Drawing Sheets

| RANGE INFORMATION | SOUND INFORMATION | REPRODUCTION INFORMATION | |
|---|---|---|---|
| RANGE A1 | SOUND S1(AUDIO GUIDE TO TEMPLE) | PRIORITY: 100 | Di1 |
| RANGE A2 | SOUND S2(SOUND OF TEMPLE BELL) | PRIORITY: 60 | Di2 |
| RANGE A3 | SOUND S3 (SOUND OF FESTIVAL MUSIC) | PRIORITY: 40 | Di3 |
| RANGE A4 | SOUND S4(AUDIO GUIDE TO SHRINE) | PRIORITY: 100 | Di4 |

INFORMATION PROVIDING SYSTEM, INFORMATION PROVIDING METHOD, AND NON-TRANSITORY COMPUTER-READABLE MEDIUM

CROSS-REFERENCE TO RELATED APPLICATIONS

This application is based on and claims priority under 35 USC 119 from Japanese Patent Application No. 2022-056333 filed on Mar. 30, 2022, the contents of which are incorporated herein by reference.

TECHNICAL FIELD

The present disclosure relates to an information providing system, an information providing method, and a non-transitory computer-readable medium.

BACKGROUND ART

There is known a technique of providing information by a sound using a speaker or the like on a street or in a store. JP2017-103598A and JP2014-236259A describe a technique of reproducing, based on position information on a user, a corresponding sound.

SUMMARY OF INVENTION

There has been a demand for reproducing a plurality of sounds based on position information on a user.

The present disclosure can be implemented in the following aspects.

(1) According to an aspect of the present disclosure, an information providing system for providing information by a sound is provided. The information providing system includes: a processor; and a memory storing instructions that, when executed by the processor, cause the information providing system to perform operations. The operations include: acquiring position information indicating a user position where a user is present; acquiring at least one of a plurality of pieces of data information, each of the plurality of pieces of data information including sound information representing a sound, range information associated with the sound information and representing a predetermined range on a map, and reproduction information associated with the sound information and indicating settings related to reproduction of the sound in the sound information; and reproducing a sound by referring to the at least one of the plurality of pieces of data information based on the position information. The reproducing the sound includes executing reproduction processing of reproducing a sound in one piece of sound information associated with one piece of range information, in accordance with one piece of reproduction information associated with the one piece of sound information. In a case in which there are one or more pieces of range information representing ranges including the user position represented by the position information, the reproduction processing is executed for each of the one or more pieces of range information.

According to the above information providing system, sound information associated with each of a plurality of predetermined ranges on the map is reproduced in accordance with the reproduction information based on the position information of the user. Therefore, a plurality of sounds can be reproduced in accordance with the respective pieces of reproduction information.

(2) In the information providing system according to the above aspect, the reproduction information may include a priority of reproduction of the sound information, and in the reproduction processing, a sound in sound information associated with first reproduction information which is reproduction information of one of the plurality of pieces of the data information may be reproduced at a sound volume higher than that of a sound in sound information associated with second reproduction information which is reproduction information of another of the plurality of pieces of the data information including a priority lower than a priority included in the first reproduction information.

According to such an aspect, a sound having a high priority is reproduced at a sound volume higher than that of a sound having a low priority. Therefore, a sound having a high priority is easily heard.

(3) In the information providing system according to the above aspect, the reproduction information may include a priority of reproduction of the sound information, and in a case in which there are two or more pieces of range information representing ranges including the user position represented by the position information, and also in a case in which there are two or more pieces of priority range information among the two or more pieces of range information, each of the priority range information being range information associated with reproduction information having a highest priority, the reproduction processing may be executed for any one of the two or more pieces of priority range information.

According to such an aspect, only one sound is reproduced even when a plurality of sounds each having the highest priority corresponding to a certain range exist. Therefore, a sound having a high priority is easily heard.

(4) In the information providing system of the above aspect, in a case in which the user moves from a position included in a first range represented by first range information for which the reproduction processing is being executed and not included in a second range which overlaps a part of the first range and enters a position included in a region in which the first range and the second range overlap, and also in a case in which the priority included in the reproduction information associated with the first range information and a he priority included in reproduction information associated with second range information representing the second range are the same, the reproduction processing for the first range information, may be stopped, and the reproduction processing for the second range information may be executed.

According to such an aspect, the reproduction of the sound information corresponding to the range information of the range that the user enters first is stopped, and the sound information corresponding to the range information of the range that the user enters later is reproduced. Therefore, the sound information associated with the range that the user enters is easily heard.

(5) In the information providing system according to the above aspect, in a case in which the user moves from a position included in a first range represented by first range information for which the reproduction processing is being executed and not included in a second range which overlaps a part of the first range and enters a position included in a region in which the first range and the second range overlap, and also in a case in which a priority included in reproduction information associated with the first range information and a priority included in reproduction information associated with second range information representing the second range are the same, the reproduction processing for the first range information may be continued without executing the reproduction processing for the second range information.

According to such an aspect, the reproduction of the sound information corresponding to the range information of the range that the user enter first is continued. Therefore, the sound that is being reproduced can be prevented from being cut in the middle.

(6) In the information providing system of the above aspect, the reproduction information may include sound source information indicating a position of a sound source that is a generation source of the sound in the sound information, and attenuation information indicating a relationship between a sound source distance and a sound volume of the sound information, the sound source distance being a distance from the sound source to the user position, and in a case in which the attenuation information indicates that the sound volume of the sound information is changed in accordance with a position of the user, the sound is reproduced at a sound volume decreasing as the sound source distance increases, and in a case in which the attenuation information does not indicate that the sound volume of the sound information is changed in accordance with the position of the user, the sound information is reproduced at a constant sound volume regardless of a change in the sound source distance.

According to such an aspect, since the sound volume of the sound information is changed in accordance with the relationship between the user position and the position of the sound source, the information can be provided to the user while making the user feel realistic.

(7) In the information providing system of the above aspect, the attenuation information may include first attenuation information to be applied to a portion of the sound information whose frequency is equal to or higher than a threshold frequency, and second attenuation information to be applied to a portion of the sound information whose frequency is lower than the threshold frequency, and a sound volume attenuation degree indicated by the first attenuation information may be larger than a sound volume attenuation degree indicated by the second attenuation information.

According to such an aspect, since a high frequency portion in the sound information is reproduced with a larger attenuation degree than a low frequency portion, the information can be provided to the user while making the user feel realistic.

(8) The information providing system according to the aspect described above may further include a sound reproduction device mountable on a head of the user, the reproduction information may include sound source information indicating a position of a sound source that is a generation source of the sound in the sound information, and in the reproduction processing, the sound reproduction device may be caused to reproduce a sound obtained by performing stereophonic processing on the sound information in accordance with the user position and the position of the sound source.

According to such an aspect, the information can be provided to the user while making the user feel realistic.

(9) In the information providing system according to the above aspect, the operations further include: acquiring movement history information indicating a movement history of the user; determining, in the reproduction processing, in a case in which the reproduction information indicates that the sound information is reproduced only in a case in which the user enters the range from a predetermined direction, whether the user enters the range from the direction by using the movement history information; and reproducing the sound in the sound information only in a case in which it is determined that the user enters the range from the direction.

According to such an aspect, the information can be provided in accordance with the movement history of the user.

(10) In the information providing system according to the above aspect, in a case in which the user leaves a third range represented by third range information which is range information of one of the plurality pieces of data information for which the reproduction processing is being executed and then enters the third range again within a given time from a time point when the user leaves the third range, the reproduction processing for the third range information may not be executed.

According to such an aspect, for example, in a case in which the user is moving around a boundary of the range, the sound can be prevented from being reproduced many times.

(11) In the information providing system according to the above aspect, within a given time from a time point when the user leaves a third range represented by third range information which is range information of one of the plurality pieces of data information for which the reproduction processing is being executed, the reproduction processing for the third range information may be continued.

According to such an aspect, for example, even in a case in which the user is moving around the boundary of the range, the user can continuously listen to the sound.

BRIEF DESCRIPTION OF DRAWINGS

The present disclosure will be described in detail based on the following figures, wherein.

DESCRIPTION OF EMBODIMENTS

A. First Embodiment

Figure 1:
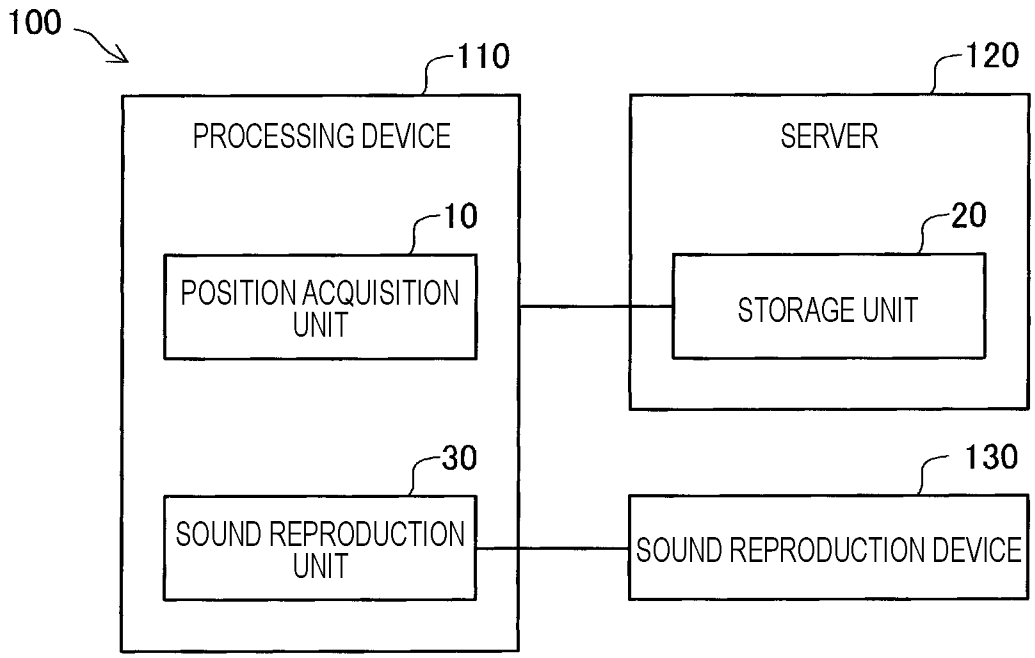
FIG. 1 is a diagram showing a configuration of an information providing system.

FIG. 1 is a diagram showing a configuration of an information providing system 100 according to the present embodiment. The information providing system 100 provides, to a user, information for providing guidance and description by a sound in accordance with a position of the user. In the present embodiment, an example will be described in which the information providing system 100 provides information on a tourist spot to a user who visits the tourist spot. The information providing system 100 includes a processing device 110, a server 120, and a sound reproduction device 130.

The server 120 includes a storage unit 20. The storage unit 20 stores a plurality of pieces of data information. The data information is information including sound information representing a sound, range information associated with the sound information and representing a predetermined range on a map, and reproduction information associated with the sound information and indicating settings related to reproduction of the sound in the sound information. In the present embodiment, the reproduction information includes a priority of the reproduction of the sound information. A higher priority indicates a higher priority for reproduction. It is preferable that the priorities in the reproduction information associated with a plurality of pieces of sound information associated with the range information representing the same range are different.

The sound reproduction device 130 is a portable device that outputs a sound represented by a signal received from the processing device 110. In the present embodiment, the sound reproduction device 130 is a device mountable on a head of the user, and is an earphone. It is assumed that the user visits the tourist spot while wearing the sound reproduction device 130 on his/her ear.

The processing device 110 includes a position acquisition unit 10 and a sound reproduction unit 30. The processing device 110 is implemented by a microcomputer including a central processing unit (CPU), a RAM, a ROM, and the like, and implements functions of these units by the microcomputer executing a program installed in advance. However, a part or all of the functions of these units may be implemented by a hardware circuit. In the present embodiment, the processing device 110 is a smartphone owned by the user. It is assumed that application software for providing information on a tourist spot to the user is installed in the processing device 110. By executing the application software, the user can receive the information on the tourist spot from the information providing system 100. It is assumed that the user carries the processing device 110 and visits the tourist spot.

The position acquisition unit 10 acquires position information indicating a user position that is a current position of the user. The position acquisition unit 10 acquires the position information detected by a global navigation satellite system (GNSS), for example, a global positioning system (GPS). In the present embodiment, the position acquisition unit 10 acquires the position information from a GPS antenna (not illustrated) provided in the processing device 110.

The sound reproduction unit 30 can execute sound reproduction processing of reproducing a sound represented by one piece of sound information associated with one piece of range information in accordance with a piece of reproduction information associated with the one piece of sound information. Further, in a case in which one or more pieces of range information each indicating a range including the user position represented by the position information acquired by the position acquisition unit 10 exist, the sound reproduction unit 30 can execute the sound reproduction processing for each of the one or more pieces of range information. In the present embodiment, for the sound in the sound information to be reproduced, the sound reproduction unit 30 reproduces a sound in the sound information having a high priority included in the reproduction information associated with the sound information at a sound volume higher than that of a sound in the sound information having a low priority included in the reproduction information associated with the sound information.

Figure 2:
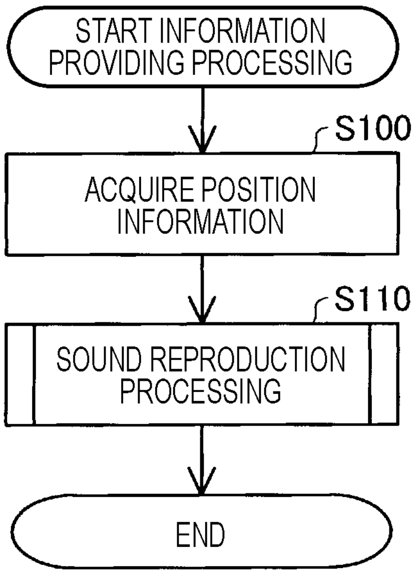
FIG. 2 is a flowchart showing an example of information providing processing.

FIG. 2 is a flowchart showing an example of information providing processing. The information providing processing is processing in which the information providing system 100 provides information to the user by a sound. The processing is repeatedly executed during an operation of the information providing system 100. First, the position acquisition unit 10 acquires the position information in step S100. This step is also referred to as a "position acquisition step".

Subsequently, in step S110, the sound reproduction unit 30 reproduces, based on the position information acquired in step S100, the sound by referring to the plurality of pieces of data information stored in the storage unit 20. This step is also referred to as a "sound reproduction step". The processing device 110 may acquire data information including range information indicating a range A1 including positions around the user position from the storage unit 20 in advance and store the data information into a storage area of the processing device 110. This step is also referred to as an "information preparation step".

Figures 3, 4:
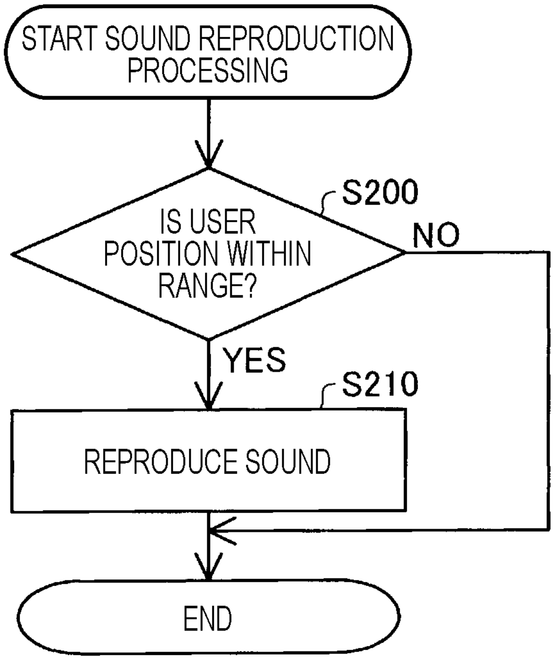
FIG. 3 is a flowchart showing an example of sound reproduction processing.
FIG. 4 is a diagram showing an example of data information.

FIG. 3 is a flowchart showing an example of the sound reproduction processing. The sound reproduction processing is a series of processing in which the sound reproduction unit 30 reproduces the sound in step S110 shown in FIG. 2. First, in step S200, the sound reproduction unit 30 determines whether the user position is included in a range represented by the range information included in any one of the pieces of data information of the data information stored in the storage unit 20. When the user position is included in any one of ranges, the sound reproduction unit 30 proceeds to processing of step S210. On the other hand, when the user position is not included in any range, the sound reproduction unit 30 ends the sound reproduction processing.

In step S210, the sound reproduction unit 30 reproduces a sound in one piece of sound information associated with one piece of range information in accordance with one piece of reproduction information associated with the piece of sound information. The processing is also referred to as "reproduction processing". That is, in a case in which one or more pieces of range information each representing a range including the user position represented by the position information acquired by the position acquisition unit 10 exist, the reproduction processing is executed for each of the one or more pieces of range information. When the user position is not included in the range represented by the range information associated with the sound information that is being reproduced, the sound reproduction unit 30 may stop the reproduction of the sound information.

FIG. 4 is a diagram showing an example of the data information. First data information Di1 includes the range information representing the range A1, sound information representing a sound S1, and reproduction information having a priority of 100. The sound S1 is an audio guide to a temple. Second data information Di2 includes range information representing a range A2, sound information representing a sound S2, and reproduction information having a priority of 60. The sound S2 is a sound of a temple bell. Third data information Di3 includes range information representing a range A3, sound information representing a sound S3, and reproduction information having a priority of 40. The sound S3 is a sound of festival music. Fourth data information Di4 includes range information representing a range A4, sound information representing a sound S4, and reproduction information having a priority of 100. The sound S4 is an audio guide to a shrine.

Figure 5:
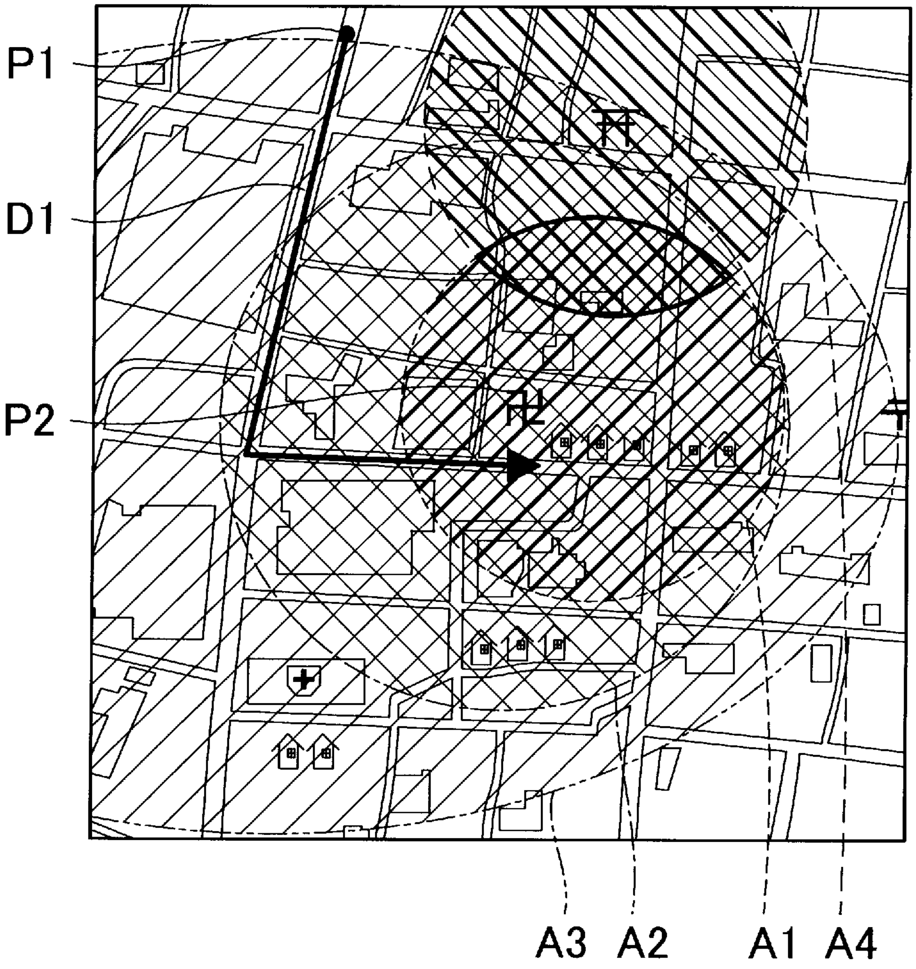
FIG. 5 is a diagram showing an example of ranges represented by range information.

FIG. 5 is a diagram showing an example of the ranges represented by the range information. The range A3 is a range including the range A1 and the range A2, and overlaps a part of the range A4. The range A2 is a range including the range A1, and overlaps a part of the range A4. The range A1 and the range A4 partially overlap each other.

Hereinafter, the information providing processing will be described using a case in which the user moves along an arrow D1 shown in FIG. 5 as an example. The user moves from a point P1 to a point P2. The point P1 is a position where the user position is not included in the range information included in any piece of data information of the data information stored in the storage unit 20. The point P2 is a position indicating the temple, and is a position included in the range A1, the range A2, and the range A3.

First, when the user enters the range A3, the sound reproduction unit 30 reproduces the sound S3. Subsequently, when the user enters the range A2, the sound reproduction unit 30 reproduces the sound S2 in addition to the sound S3. The sound reproduction unit 30 reproduces the sound S2 at a sound volume higher than that of the sound S3. Further, when the user enters the range A1, the sound S1 is reproduced in addition to the sound S3 and the sound S2. The sound reproduction unit 30 reproduces the sound S1 at a sound volume higher than that of the sound S2. Further, since the user does not enter the range A4, the sound reproduction unit 30 does not reproduce the sound S4.

According to the information providing system of the present embodiment described above, the sound reproduction unit 30 outputs the sound information associated with each of a plurality of predetermined ranges on the map in accordance with the reproduction information based on the position information of the user. Therefore, a plurality of sounds can be reproduced in accordance with respective pieces of reproduction information.

Further, the sound reproduction unit 30 reproduces a sound having a high priority at a sound volume higher than that of a sound having a low priority. Therefore, a sound having a high priority is easily heard.

B. Second Embodiment

A second embodiment is different from the first embodiment in that, when there are two or more pieces of range information (hereinafter, "priority range information") each corresponding a highest priority in the reproduction information associated with a plurality of pieces of range information of a plurality of ranges each including the user position, the sound information associated with any one of pieces of priority range information among the plurality of pieces of priority range information is reproduced. Since the configuration of the information providing system 100 according to the second embodiment is the same as the configuration of the information providing system 100 according to the first embodiment, description of the configuration of the information providing system 100 will be omitted.

In the present embodiment, in a case in which two or more pieces of range information each representing a range including the user position represented by the position information acquired by the position acquisition unit 10 exist, when two or more pieces of priority range information exist, the sound reproduction unit 30 executes the reproduction processing for any one of pieces of priority range information among the two or more pieces of priority range information. Further, in a case in which the user enters, from a position included in a range represented by the range information (hereinafter, also referred to as "first range information") for which the reproduction processing is being executed and not included in another range, a position included in a region in which a certain range and the another range overlap each other, when a priority included in the reproduction information associated with the first range information and a priority included in the reproduction information associated with range information (hereinafter, also referred to as "second range information") representing the another range are the same, the sound reproduction unit 30 stops the reproduction processing for the first range information, and executes the reproduction processing for the second range information.

Figure 6:
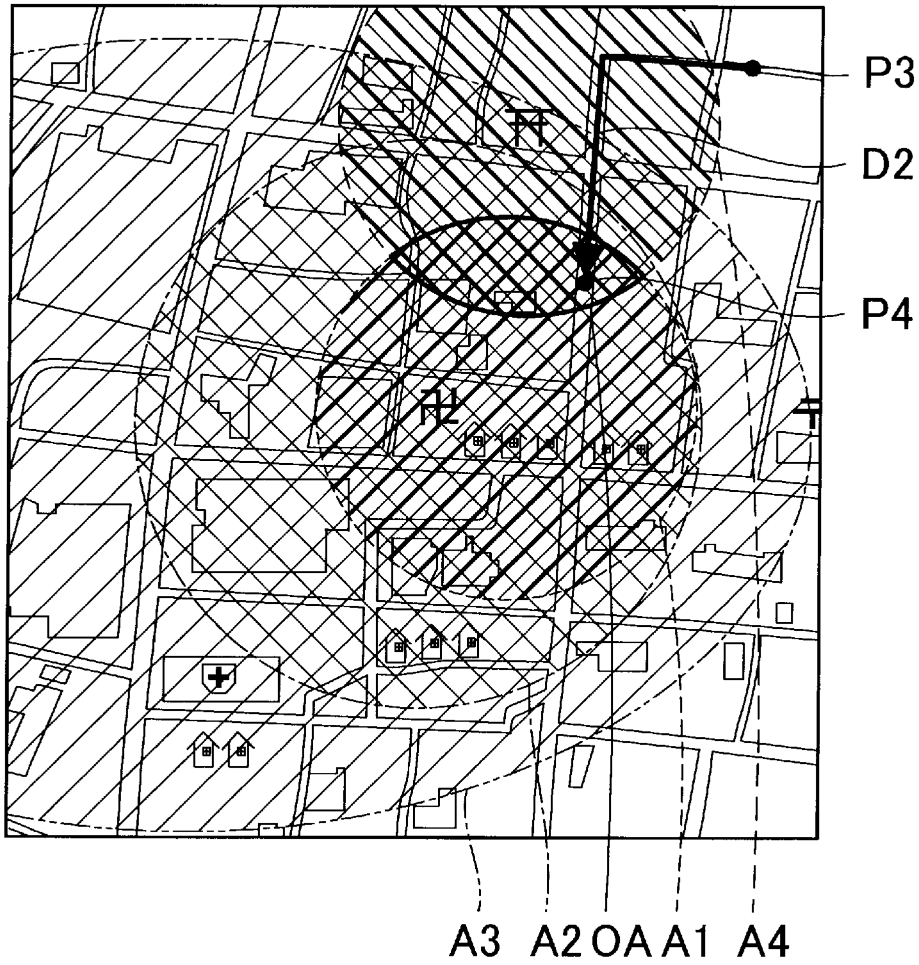
FIG. 6 is a diagram showing movement of a user in a second embodiment.

FIG. 6 is a diagram illustrating movement of the user in the second embodiment. Hereinafter, the information providing processing will be described using a case in which the user moves along an arrow D2 shown in FIG. 6 as an example. The user moves from a point P3 to a point P4. The point P3 is a position where the user position is not included in range information included in any piece of data information of the data information stored in the storage unit 20. The point P4 is a position indicating a shrine, and is a position included in the range A1, the range A2, the range A3, and the range A4.

A region OA is a region in which the range A1, the range A2, the range A3, and the range A4 overlap. Therefore, when the user position is included in the region OA, four pieces of data information each including the range information indicating the range including the user position exist, that is, the first data information Di1, the second data information Di2, the third data information Di3, and the fourth data information Di4. Among priorities included in the reproduction information included in the data information, the highest priority is 100. That is, two pieces of data information each including the priority range information exist, that is, the first data information Di1 and the fourth data information Di4. Therefore, when the user position is included in the region OA, the sound reproduction unit 30 reproduces any one of the sound S1 in the sound information included in the first data information Di1 and the sound S4 in the sound information included in the fourth data information Di4.

First, when the user enters the range A4, the sound reproduction unit 30 reproduces the sound S4. Subsequently, when the user enters the range A3, the sound S3 is reproduced in addition to the sound S4. The sound reproduction unit 30 reproduces the sound S3 at a sound volume lower than that of the sound S4. Subsequently, when the user enters the range A2, the sound reproduction unit 30 reproduces the sound S2 in addition to the sound S4 and the sound S3. The sound reproduction unit 30 reproduces the sound S2 at a sound volume lower than that of the sound S3. Further, when the user enters the range A1, the sound S1 is reproduced without reproducing the sound S4. That is, the sound S1, the sound S2, and the sound S3 are reproduced. The sound reproduction unit 30 reproduces the sound S1 at a sound volume higher than that of the sound S2.

According to the information providing system of the second embodiment described above, the sound reproduction unit 30 outputs only one sound even when there are a plurality of sounds with the highest priority corresponding to the certain region OA. Therefore, a sound having a high priority is easily heard.

Further, the sound reproduction unit 30 stops the reproduction of the sound S4 in the sound information corresponding to the range information of the range A4 that the user enters earlier, and reproduces the sound S1 in the sound information corresponding to the range information of the range A1 that the user enters later. Therefore, the sound S1 in the sound information associated with the range A1 that the user enters is easily heard.

C. Third Embodiment

A third embodiment is different from the first embodiment in that a sound volume is changed in accordance with a distance between the user position and a sound source in the reproduction processing. Since the configuration of the information providing system 100 of the third embodiment is the same as the configuration of the information providing system 100 of the first embodiment, description of the configuration of the information providing system 100 will be omitted.

The reproduction information in the present embodiment includes sound source information indicating a position of a sound source that is a generation source of the sound in the sound information, and attenuation information indicating a relationship between a distance (hereinafter, also referred to as "sound source distance") from the sound source to the user position and a sound volume of the sound information.

Figure 7:
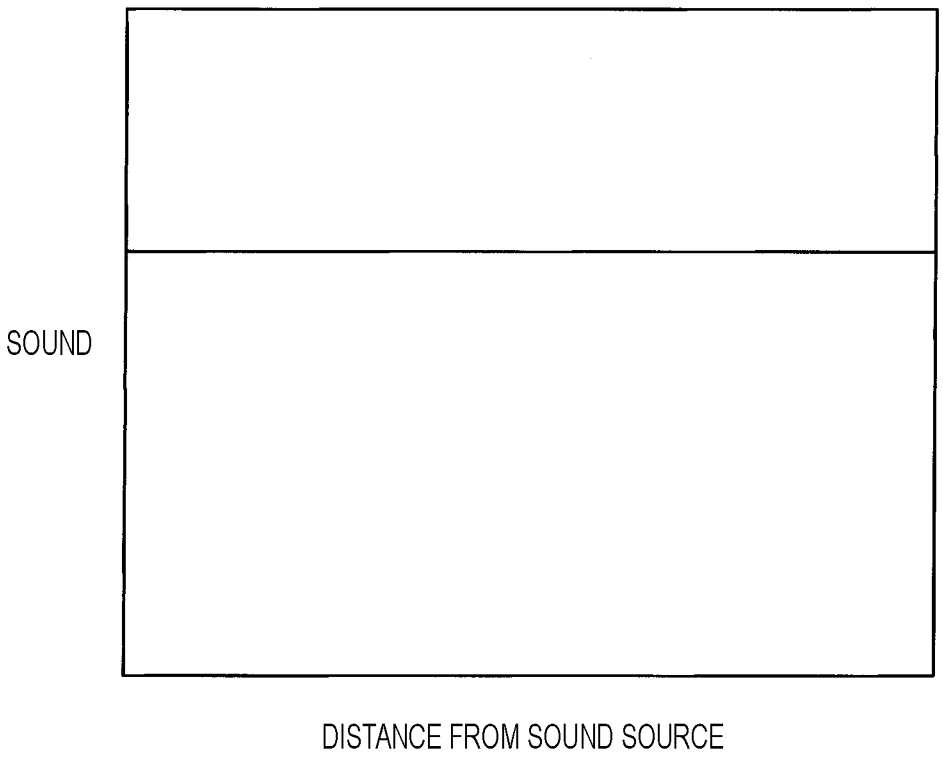
FIG. 7 is a diagram showing an example of attenuation information.
Figure 8:
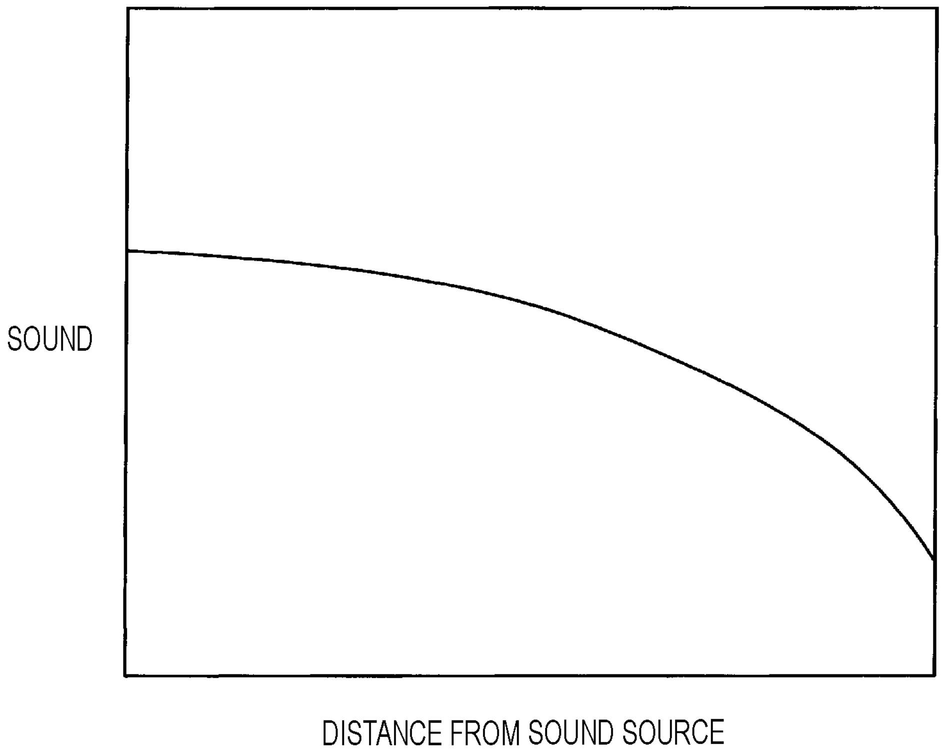
FIG. 8 is a diagram showing another example of the attenuation information.
Figure 9:
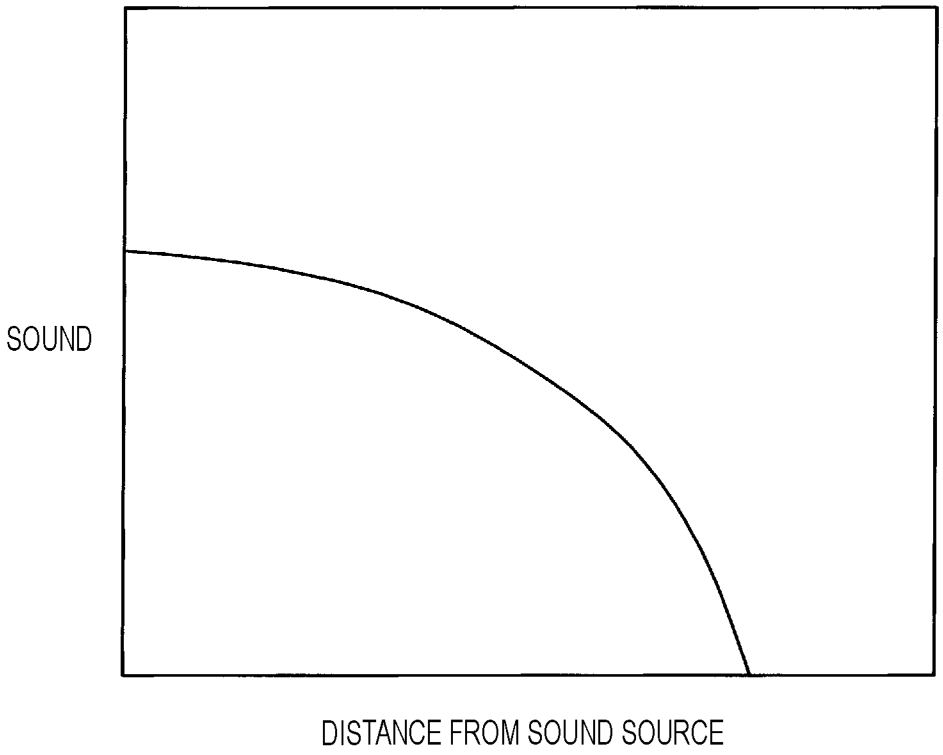
FIG. 9 is a diagram showing yet another example of the attenuation information.

FIGS. 7, 8, and 9 are diagrams showing examples of the attenuation information. In graphs of FIGS. 7, 8, and 9, a horizontal axis represents the distance from the sound source to the user position, and a vertical axis represents the sound volume. The attenuation information shown in FIG. 7 indicates that the sound volume of the sound information is constant regardless of the position of the user. The attenuation information shown in FIGS. 8 and 9 indicates that the sound volume of the sound information is reduced as the user position moves away from the sound source, that is, as the sound source distance increases. It is shown that the sound volume is attenuated more slowly in the attenuation information shown in FIG. than that in the attenuation information shown in FIG. 9. In the present embodiment, the reproduction information included in the first data information Di1 and the fourth data information Di4 both including sound information representing the audio guide includes the attenuation information shown in FIG. 7. The reproduction information included in the second data information Di2 and the third data information Di3 both including sound information representing an environmental sound includes the attenuation information shown in FIGS. 8 and 9. Therefore, the sound reproduction unit 30 can reproduce the audio guide at a constant sound volume regardless of the user position, and can reproduce the environmental sound at a sound volume corresponding to the sound source distance. Further, the sound reproduction unit 30 can reproduce each piece of sound information at a sound volume corresponding to the sound source distance in accordance with a different attenuation degree.

According to the information providing system of the third embodiment described above, since the sound volume of the sound information changes in accordance with the relationship between the user position and the sound source, the information can be provided to the user while making the user feel realistic.

D. Other Embodiments (D1) In the embodiments described above, the data information is stored in the server 120. The present disclosure is not limited thereto, and the data information may be stored in the information providing system 100. That is, the information providing system 100 may include the storage unit 20.

(D2) In the embodiments described above, the sound reproduction device 130 may include the sound reproduction unit 30. Further, the sound reproduction device 130 may include the position acquisition unit 10.

(D3) In the embodiments described above, the sound reproduction unit 30 may output, to the sound reproduction device 130, a sound obtained by performing stereophonic processing on the sound information in accordance with the user position and the sound source. In this case, the reproduction information includes the sound source information indicating the position of the sound source which is the generation source of the sound in the sound information associated with the reproduction information. Further, the position acquisition unit 10 may acquire face direction information indicating a face direction which is a direction in which a face of the user faces. For example, the sound reproduction unit 30 calculates an azimuth angle between two points including the user position and the sound source with the true north as 0 degree, and generates a stereophonic sound in accordance with a relative angle between the face direction and the azimuth angle between the two points.

(D4) In the embodiments described above, the range information may include information in a height direction. In this case, the position acquisition unit 10 acquires, for example, the position of the user from an altitude sensor as the position information.

(D5) In the embodiments described above, the reproduction information may include information indicating whether to repeatedly reproduce the sound information associated with the reproduction information. When the reproduction information indicates repeated reproduction, the sound reproduction unit 30 repeatedly reproduces the sound in the sound information when the range in the range information associated with the sound information associated with the reproduction information includes the user position. Further, the reproduction information may not include the priority as long as including information indicating the settings related to reproduction of the sound in the sound information associated with the reproduction information. For example, the reproduction information may be information including only the sound source information.

(D6) In the embodiments described above, the reproduction information may include that the sound in the sound information is reproduced only when the user enters, from a predetermined direction, the range in the range information associated with the sound information associated with the reproduction information. In this case, the position acquisition unit 10 acquires movement history information indicating a movement history of the user. In a case in which the reproduction information indicates that the sound in the sound information is reproduced only when the user enters, from a predetermined specific direction, the range in the range information associated with the sound information associated with the reproduction information, the sound reproduction unit 30 determines whether the user enters the range from the specific direction using the movement history information. The sound reproduction unit 30 reproduces the sound in the sound information only when it is determined that the user enters the range from the specific direction. According to this aspect, information corresponding to the movement history of the user can be provided.

(D7) In the embodiments described above, when the user enters again, within a predetermined time from a time point when the user leaves a range represented by the range information for which the reproduction processing is being executed, the range represented by the range information, the sound reproduction unit 30 may not perform the reproduction processing for the range information. According to this aspect, for example, when the user is moving around a boundary of a certain range, the sound in the sound information associated with the range information indicating the range can be prevented from being reproduced many times.

(D8) In the embodiments described above, the sound reproduction unit 30 may continue, within a predetermined time from a time point when the user leaves a range represented by the range information for which the reproduction processing is being executed, the reproduction processing for the range information. According to this aspect, for example, even when the user is moving around a boundary of a certain range, the user can continuously listen to the sound in the sound information associated with the range information representing the range without interruption.

(D9) In the second embodiment described above, when the priority in the range information representing the range A4 for which the reproduction processing is executed earlier and the priority in the range information representing the range A1 that the user enters later are the same, the sound reproduction unit 30 stops the reproduction processing for the range information of the range A4 that the user enters earlier and gives a priority to the reproduction processing for the range information of the range A1 that the user enters later. Alternatively, the sound reproduction unit 30 may continue the reproduction processing for the range information of the range A4 that the user enters first, and may not execute the reproduction processing for the range information of the range A1 that the user enters later. That is, in a case in which the user enters a position included in the region OA in which a first range represented by the first range information for which the reproduction processing is being executed and a second range overlap from a position included in the first range and not included in the second range, when a priority included in the reproduction information associated with the first range information and a priority included in the reproduction information associated with the second range information representing the second range are the same, the reproduction processing for the second range information is not executed, and the reproduction processing for the first range information is continued. According to this aspect, the output of the sound information corresponding to the range information of the range that the user enters first is continued. Therefore, the sound that is being reproduced can be prevented from being cut in the middle. Further, the information providing system 100 may have a configuration in which the user can select which of the reproduction processing for the range information of the range that the user enters first and the reproduction processing for the range information of the range that the user enters later is preferentially executed. For example, the processing device 110 includes a selection unit that can be selected by the user.

(D10) In the third embodiment described above, the attenuation information may include attenuation information to be applied to each of a plurality of predetermined frequency ranges. For example, the attenuation information may include first attenuation information to be applied to a portion of the sound information whose frequency is equal to or higher than a predetermined threshold frequency, and second attenuation information to be applied to a portion of the sound information whose frequency is lower than the threshold frequency. A sound volume attenuation degree indicated by the first attenuation information is larger than a sound volume attenuation degree indicated by the second attenuation information. According to this aspect, since a high frequency portion in the sound information is reproduced with an attenuation degree larger than that of a low frequency portion, the information can be provided to the user while making the user feel realistic. Further, the attenuation information may include information related to a band-pass filter (BPF) that attenuates a frequency outside a predetermined range or a band-elimination filter (BEF) that attenuates a frequency in a predetermined range.

The present disclosure is not limited to the embodiments described above, and can be implemented in various configurations without departing from the scope of the present disclosure. For example, the technical features in the embodiments corresponding to the technical features in the aspects described in Summary can be appropriately replaced or combined in order to solve a part or all of the problems described above or in order to achieve a part or all of the effects described above. Any of the technical features may be omitted as appropriate unless the technical feature is described as essential herein.

What is claimed is:

1. An information providing system for providing information by a sound, the information providing system comprising:

a processor; and a memory storing instructions that, when executed by the processor, cause the information providing system to perform operations, the operations comprising:

acquiring position information indicating a user position where a user is present;

acquiring at least one of a plurality of pieces of data information, each of the plurality of pieces of data information including sound information representing a sound, range information associated with the sound information and representing a predetermined range on a map, and reproduction information associated with the sound information and indicating settings related to reproduction of the sound in the sound information; and reproducing a sound by referring to the at least one of the plurality of pieces of data information based on the position information, wherein the reproducing the sound comprises executing reproduction processing of reproducing a sound in one piece of sound information associated with one piece of range information, in accordance with one piece of reproduction information associated with the one piece of sound information, wherein in a case in which there are one or more pieces of range information representing ranges including the user position represented by the position information, the reproduction processing is executed for each of the one or more pieces of range information, wherein the reproduction information includes a priority of reproduction of the sound information, and wherein in the reproduction processing, a sound in sound information associated with first reproduction information which is reproduction information of one of the plurality of pieces of the data information is reproduced at a sound volume higher than that of a sound in sound information associated with second reproduction information which is reproduction information of another of the plurality of pieces of the data information including a priority lower than a priority included in the first reproduction information.

2. The information providing system according to claim 1, wherein in a case in which the user moves from a position included in a first range represented by first range information for which the reproduction processing is being executed and not included in a second range which overlaps a part of the first range and enters a position included in a region in which the first range and the second range overlap, and also in a case in which a priority included in reproduction information associated with the first range information and a priority included in reproduction information associated with second range information representing the second range are the same, the reproduction processing for the first range information is stopped, and the reproduction processing for the second range information is executed.

3. The information providing system according to claim 1, wherein in a case in which the user moves from a position included in a first range represented by first range information for which the reproduction processing is being executed and not included in a second range which overlaps a part of the first range and enters a position included in a region in which the first range and the second range overlap, and also in a case in which a priority included in reproduction information associated with the first range information and a priority included in reproduction information associated with second range information representing the second range are the same, the reproduction processing for the first range information is continued without executing the reproduction processing for the second range information.

4. The information providing system according to claim 1, further comprising:

a sound reproduction device mountable on a head of the user, wherein the reproduction information includes sound source information indicating a position of a sound source that is a generation source of the sound in the sound information, and wherein in the reproduction processing, the sound reproduction device is caused to reproduce a sound obtained by performing stereophonic processing on the sound information in accordance with the user position and the position of the sound source.

5. An information providing system for providing information by a sound, the information providing system comprising:

a processor; and a memory storing instructions that, when executed by the processor, cause the information providing system to perform operations, the operations comprising:

acquiring position information indicating a user position where a user is present;

acquiring at least one of a plurality of pieces of data information, each of the plurality of pieces of data information including sound information representing a sound, range information associated with the sound information and representing a predetermined range on a map, and reproduction information associated with the sound information and indicating settings related to reproduction of the sound in the sound information; and reproducing a sound by referring to the at least one of the plurality of pieces of data information based on the position information, wherein the reproducing the sound comprises executing reproduction processing of reproducing a sound in one piece of sound information associated with one piece of range information, in accordance with one piece of reproduction information associated with the one piece of sound information, wherein in a case in which there are one or more pieces of range information representing ranges including the user position represented by the position information, the reproduction processing is executed for each of the one or more pieces of range information, wherein the reproduction information includes a priority of reproduction of the sound information, and wherein in a case in which there are two or more pieces of range information representing ranges including the user position represented by the position information, and also in a case in which there are two or more pieces of priority range information among the two or more pieces of range information, each of the priority range information being range information associated with reproduction information having a highest priority, the reproduction processing is executed for any one of the two or more pieces of priority range information.

6. An information providing system for providing information by a sound, the information providing system comprising:

a processor; and a memory storing instructions that, when executed by the processor, cause the information providing system to perform operations, the operations comprising:

acquiring position information indicating a user position where a user is present;

acquiring at least one of a plurality of pieces of data information, each of the plurality of pieces of data information including sound information representing a sound, range information associated with the sound information and representing a predetermined range on a map, and reproduction information associated with the sound information and indicating settings related to reproduction of the sound in the sound information; and reproducing a sound by referring to the at least one of the plurality of pieces of data information based on the position information, wherein the reproducing the sound comprises executing reproduction processing of reproducing a sound in one piece of sound information associated with one piece of range information, in accordance with one piece of reproduction information associated with the one piece of sound information, wherein in a case in which there are one or more pieces of range information representing ranges including the user position represented by the position information, the reproduction processing is executed for each of the one or more pieces of range information, wherein the reproduction information includes sound source information indicating a position of a sound source that is a generation source of the sound in the sound information, and attenuation information indicating a relationship between a sound source distance and a sound volume of the sound information, the sound source distance being a distance from the sound source to the user position, wherein in a case in which the attenuation information indicates that the sound volume of the sound information is changed in accordance with a position of the user, the sound information is reproduced at a sound volume decreasing as the sound source distance increases, wherein in a case in which the attenuation information does not indicate that the sound volume of the sound information is changed in accordance with the position of the user, the sound information is reproduced at a constant sound volume regardless of a change in the sound source distance, wherein the attenuation information includes first attenuation information to be applied to a portion of the sound information whose frequency is equal to or higher than a threshold frequency, and second attenuation information to be applied to a portion of the sound information whose frequency is lower than the threshold frequency, and wherein a sound volume attenuation degree indicated by the first attenuation information is larger than a sound volume attenuation degree indicated by the second attenuation information.

7. An information providing system for providing information by a sound, the information providing system comprising:

a processor; and a memory storing instructions that, when executed by the processor, cause the information providing system to perform operations, the operations comprising:

acquiring position information indicating a user position where a user is present;

acquiring at least one of a plurality of pieces of data information, each of the plurality of pieces of data information including sound information representing a sound, range information associated with the sound information and representing a predetermined range on a map, and reproduction information associated with the sound information and indicating settings related to reproduction of the sound in the sound information; and reproducing a sound by referring to the at least one of the plurality of pieces of data information based on the position information, wherein the reproducing the sound comprises executing reproduction processing of reproducing a sound in one piece of sound information associated with one piece of range information, in accordance with one piece of reproduction information associated with the one piece of sound information, wherein in a case in which there are one or more pieces of range information representing ranges including the user position represented by the position information, the reproduction processing is executed for each of the one or more pieces of range information, wherein the operations further comprise:

acquiring movement history information indicating a movement history of the user;

determining, in the reproduction processing, in a case in which the reproduction information indicates that the sound information is reproduced only in a case in which the user enters the range from a predetermined direction, whether the user enters the range from the direction by using the movement history information; and reproducing the sound in the sound information only in a case in which it is determined that the user enters the range from the direction.

8. An information providing system for providing information by a sound, the information providing system comprising:

a processor; and a memory storing instructions that, when executed by the processor, cause the information providing system to perform operations, the operations comprising:

acquiring position information indicating a user position where a user is present;

acquiring at least one of a plurality of pieces of data information, each of the plurality of pieces of data information including sound information representing a sound, range information associated with the sound information and representing a predetermined range on a map, and reproduction information associated with the sound information and indicating settings related to reproduction of the sound in the sound information; and reproducing a sound by referring to the at least one of the plurality of pieces of data information based on the position information, wherein the reproducing the sound comprises executing reproduction processing of reproducing a sound in one piece of sound information associated with one piece of range information, in accordance with one piece of reproduction information associated with the one piece of sound information, wherein in a case in which there are one or more pieces of range information representing ranges including the user position represented by the position information, the reproduction processing is executed for each of the one or more pieces of range information, and wherein in a case in which the user leaves a third range represented by third range information which is range information of one of the plurality pieces of the data information for which the reproduction processing is being executed and then enters the third range again within a given time from a time point when the user leaves the third range, the reproduction processing for the third range information is not executed.

9. An information providing system for providing information by a sound, the information providing system comprising:

a processor; and a memory storing instructions that, when executed by the processor, cause the information providing system to perform operations, the operations comprising:

acquiring position information indicating a user position where a user is present;

acquiring at least one of a plurality of pieces of data information, each of the plurality of pieces of data information including sound information representing a sound, range information associated with the sound information and representing a predetermined range on a map, and reproduction information associated with the sound information and indicating settings related to reproduction of the sound in the sound information; and reproducing a sound by referring to the at least one of the plurality of pieces of data information based on the position information, wherein the reproducing the sound comprises executing reproduction processing of reproducing a sound in one piece of sound information associated with one piece of range information, in accordance with one piece of reproduction information associated with the one piece of sound information, wherein in a case in which there are one or more pieces of range information representing ranges including the user position represented by the position information, the reproduction processing is executed for each of the one or more pieces of range information, and wherein within a given time from a time point when the user leaves a third range represented by third range information which is range information of one of the plurality pieces of the data information for which the reproduction processing is being executed, the reproduction processing for the third range information is continued.

10. An information providing method in which a computer carriable by a user provides information by a sound, the information providing method comprising:

acquiring position information indicating a user position where the user is present;

acquiring data information including sound information representing a sound, range information associated with the sound information and representing a predetermined range on a map, and reproduction information associated with the sound information and indicating settings related to reproduction of the sound in the sound information; and reproducing a sound by referring to the data information based on the position information, wherein the reproducing the sound comprises executing, in a case in which there are one or more pieces of range information representing ranges including the user position represented by the position information, reproduction processing for each of the one or more pieces of range information, wherein the reproduction processing is processing of reproducing a sound in one piece of sound information associated with one piece of range information, in accordance with one piece of reproduction information associated with the one piece of sound information, wherein the reproduction information includes a priority of reproduction of the sound information, and wherein in the reproduction processing, a sound in sound information associated with first reproduction information which is reproduction information of the one or more pieces of range information is reproduced at a sound volume higher than that of a sound in sound information associated with second reproduction information which is reproduction information of another of the one or more pieces of range information including a priority lower than a priority included in the first reproduction information.

11. A non-transitory computer-readable medium storing an information providing program for providing information by a sound, the information providing program, when executed by a processor, to cause a computer to perform operations, the operations comprising:

acquiring position information indicating a user position where the user is present;

acquiring data information including sound information representing a sound, range information associated with the sound information and representing a predetermined range on a map, and reproduction information associated with the sound information and indicating settings related to reproduction of the sound in the sound information; and reproducing a sound by referring to the data information based on the acquired position information, wherein the reproducing the sound comprises executing, in a case in which there are one or more pieces of range information representing ranges including the user position represented by the position information, reproduction processing for each of the one or more pieces of range information, wherein the reproduction processing is processing of reproducing a sound in one piece of sound information associated with one piece of range information, in accordance with one piece of reproduction information associated with the one piece of sound information, wherein the reproduction information includes a priority of reproduction of the sound information, and wherein in the reproduction processing, a sound in sound information associated with first reproduction information which is reproduction information of one of the one or more pieces of range information is reproduced at a sound volume higher than that of a sound in sound information associated with second reproduction information which is reproduction information of another of the one or more pieces of range information including a priority lower than a priority included in the first reproduction information.

* * * * *